US007753635B2

(12) United States Patent
Huotari et al.

(10) Patent No.: US 7,753,635 B2
(45) Date of Patent: Jul. 13, 2010

(54) METHOD AND DEVICE FOR MANUFACTURING THE COVERS OF A BOOK OR SIMILAR

(75) Inventors: Henri Huotari, Espoo (FI); Iisakki Huotari, Helsinki (FI)

(73) Assignee: Maping Ky (FI)

( * ) Notice: Subject to any disclaimer, the term of this patent is extended or adjusted under 35 U.S.C. 154(b) by 1039 days.

(21) Appl. No.: 11/340,267

(22) Filed: Jan. 26, 2006

(65) Prior Publication Data

US 2006/0210380 A1 Sep. 21, 2006

(30) Foreign Application Priority Data

Jan. 27, 2005 (FI) ................................ 20050089

(51) Int. Cl.
*B42C 7/00* (2006.01)
*G01D 21/00* (2006.01)

(52) U.S. Cl. .............................. 412/17; 412/3; 33/613; 33/623

(58) Field of Classification Search ..................... 412/3, 412/4, 5, 6, 8, 17–20, 33, 36, 37, 901; 269/91, 269/94; 33/613, 614; 156/230, 391, 556
See application file for complete search history.

(56) References Cited

U.S. PATENT DOCUMENTS

| | | | | |
|---|---|---|---|---|
| 1,460,348 | A * | 6/1923 | Nelson | 33/501 |
| 2,069,885 | A * | 2/1937 | Jeffreys | 156/389 |
| 3,492,182 | A * | 1/1970 | Howard | 156/230 |
| 6,379,094 | B1 * | 4/2002 | Porat | 412/9 |
| 7,478,988 | B2 * | 1/2009 | Porat | 412/4 |

* cited by examiner

*Primary Examiner*—Dana Ross
*Assistant Examiner*—Kyle Grabowski
(74) *Attorney, Agent, or Firm*—Skinner and Associates

(57) ABSTRACT

A method and device for manufacturing the covers of a book using a surface material and cover pieces glued to it. In order to glue the cover pieces to the surface material, a device equipped with a work table is used, on top of which the surface material is positioned. The cover pieces are glued to the surface material by supporting one end of them, in the initial stage, free of the glue surface with the aid of a shelf-like support piece and commencing gluing from a point farthest from the said end.

9 Claims, 2 Drawing Sheets

METHOD AND DEVICE FOR MANUFACTURING THE COVERS OF A BOOK OR SIMILAR

CROSS-REFERENCE TO RELATED APPLICATIONS, IF ANY

Not applicable.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND

The present invention relates to a method and device for manufacturing the covers of a book or similar. More specifically, the invention relates to a method and device, which are operated mainly manually when gluing cover boards in a precisely specified position on a base material for use in a later stage for attaching the interior of a book or similar between the covers manufactured in this manner.

Manufacturing the covers of a book as handwork is relatively slow and expensive work that demands precision. Usually, it is performed by spreading glue on top of the sheet that will be the surface material of the cover, placing the sheet on a table surface with the glued side upwards, and setting the three cardboard or similar pieces forming the cover in place on the glued surface, then pressing them onto the surface to ensure the gluing and folding the parts of the sheet, which remain outside the cardboard pieces, over the edges onto the inside cover of the book then gluing them onto it. As stated, the work demands precision and care in many ways, as a relatively small error in positioning will be enough to make the cover useless.

Finnish patent 107597 discloses a method and device, with the aid of which some of the drawbacks affecting the prior art are eliminated. In it, positioning takes place by setting the covers in certain holders more or less in a vertical position and then turning the holder construction to a horizontal position against a glue-surfaced cover film.

The said construction is a sensible way to achieve an end result of good quality, but it has the drawbacks of the complexity and expense of the structures.

BRIEF SUMMARY

The present invention is intended to create a method and device, with the aid of which the manufacture of covers of the type referred to will take place more rapidly than traditionally and will always be dimensionally accurate, so that sub-standard goods are not made and the operations are automated to a certain degree. The intention is particularly to create a method and device, with the aid of which covers can be made more simply and using cheaper equipment, than is the case with known systems.

The aforementioned and other advantages and benefits of the present invention are achieved by means of a method and device, the characteristic features of which are stated in the accompanying Claims.

In the following, the invention is examined in greater detail with reference to the accompanying drawings, which show one embodiment of the invention, which is in no way restricted to it.

BRIEF DESCRIPTION OF THE SEVERAL VIEWS OF THE DRAWING

The present invention, and the manner and process of making and using it, will be better understood by those skilled in the art by reference to the following drawings.

DETAILED DESCRIPTION

Figure 1:
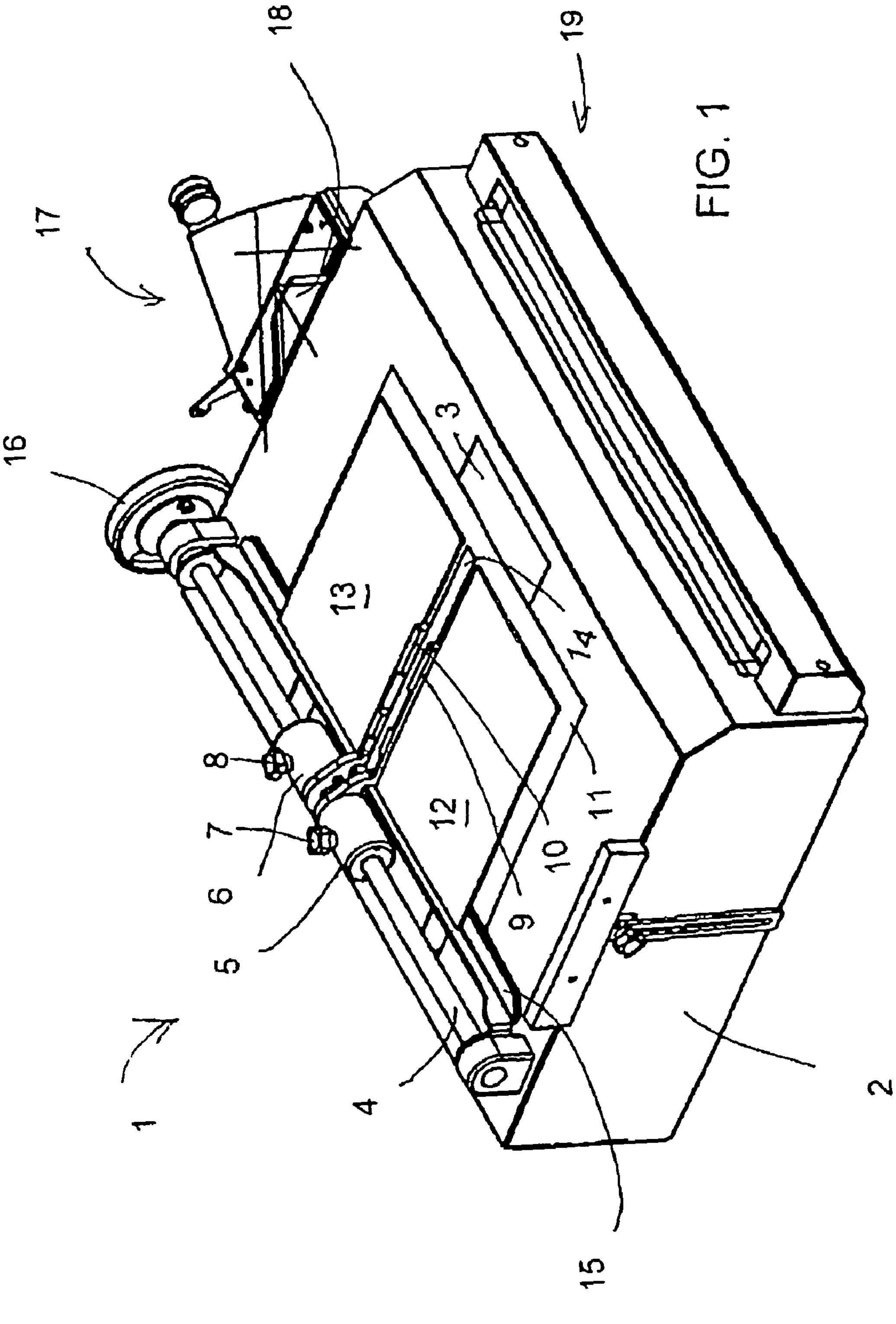
FIG. 1 shows the device for making the covers of a book, with the components for forming the cover in the initial positioning state

Manufacture of the covers of a book is described in detail in the Finnish patent 107597, which is hereby incorporated by reference in its entirety. In the present invention the question is in principle of the same operation but implemented in another manner.

Thus, the process in its simplicity is as follows. The intention is to make the covers of a book or similar using glue-surfaces films, which are surface glued to stiff or semi-stiff cover pieces mainly of cardboard. There are three cover pieces; two larger pieces forming the actual covers and a narrower spine piece located at a small distance from both of the over pieces. After gluing, a small piece, which extends to nearly the corner of the cover piece and is cut at an angle of about 45 degrees, is cut off each corner of the glue film. The parts of the glue film extending beyond the cover pieces are then folded and glued to the side edges of the cover pieces.

The device 1 according to the invention in formed of a box-like body 2, on the upper table-like surface of which there is a transparent component 3 equipped with alignment lines for positioning, and which is illuminated by a light source inside the body.

Two sliding pieces 5 and 6 are set on a rod 4 and can be slid along the rod 4 and tightened in place with the aid of screws 7 and 8. There are fixed finger-like guides 9 and 10 in the sliding pieces 5 and 6.

A film 11 equipped with a glue surface is aligned according to the alignment markings on the table. The alignment markings appear, as stated above, on the light table 3 and there are also corresponding alignment marking in the film 11. The detachable membrane is removed from the film before positioning on the table, thus exposing the glue surface on the upper surface.

The positioning of the film 11 can be performed either by raising the guides 9 and 10 by rotating the rod 4, or also by lowering the guides to the position in which the next work stages will be performed. The guides 9 and 10 are supported in the lower position in such a way that they do not touch the table or the film on it, but are nevertheless sufficiently close to it for it to be impossible for the cover pieces to go under the guides during positioning, but instead they lie suitably against the guides.

The alignment markings are such that, in FIG. 1, the left-hand guide 9 is placed in such a way that its position can, in practice, be regarded as constant, which means that the left-hand cover cardboard 12 shown in FIG. 1 can also be placed against the guide 9 and in the same way the spine piece 14 can be placed to rest on the guide 9, naturally on the other side of it. As can be clearly seen from the figures, the positions of the guides are such that the cover pieces 12, 13, and 14, to be attached to the film, will be automatically correctly aligned, once they are positioned precisely in place.

The core of the invention is the fact that there is a support 15 in the device, which can be referred to, for instance, as a shelf. The support 15 is vertically slightly free of the upper surface of the table of the device. The horizontal extent of the shelf 15 is not very critical, but it must, however, be sufficient to retain the covers 12, 13, and 14 in the initial stage of the work.

Thus, according to the invention, the making of the covers is commenced by removing the protective surface from the film 11 and placing the film in the desired position, with its glue side upwards. After this, one cover piece, for example 12, is taken and its rear edge (in the figure) is placed on top of the shelf 15, so that it does not adhere to the glue surface, its position is checked to be correct and, possibly by bending it slightly, its parts that are at a distance from the shelf 15 are placed to adhere on the glue surface of the film 11. The position is then ensured. After this, the parts 13 and 14 are set in place.

Figure 2:
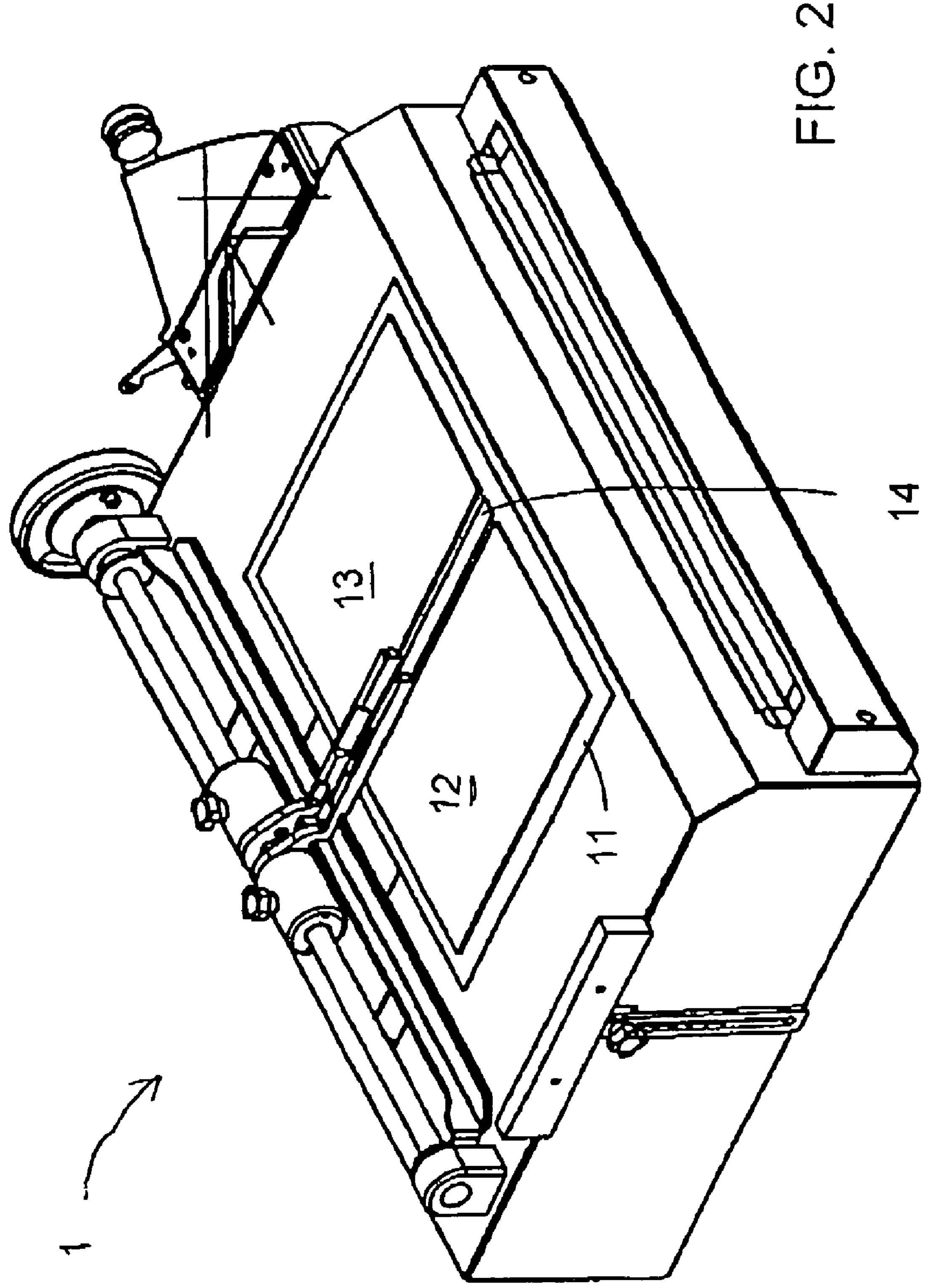
FIG. 2 shows the components in their final position pressed onto the glue film and ready for the final operations.

Next, the combination of the cover pieces and the film are slid towards the front part of the device, when the rear edges of the cover pieces 12, 13, and 14 are released from the support of the shelf 15 and adhere to the glue surface of the film 11. The position is then that of FIG. 2, in which the covers are fully attached to the film.

Next, the guides 9 and 10 can be turned away by using the wheel 16 attached to the end of the shaft 4.

In order to finish the covers, the cutter 17 forming part of the device, in which there are guide surfaces 18, by pressing the combination of the covers and the film against which it is automatically guided to an angle of about 45 degrees, in which the corners of the film 11 can be cut away one at a time. The final operation is the folding of the parts of the film extending beyond the cover pieces and the gluing of them against the side edges of the covers. This can be done schematically in the device marked with the number 19, in which there is a suitable gap for making a fold and to which there may be also attached a device for creating pressure to ensure the gluing.

The method and device according to the invention provide a simple, cheap, and functional arrangement for making covers etc. The use of the arrangement according to the invention creates only perfect cover, once the basic operations have been learned.

It is obvious that the invention described above is only one embodiment of the invention, which is naturally not the only one possible. Other variations and adaptations are possible while nevertheless remaining with the scope of protection of the basic inventive idea and the accompanying Claims. Thus the invention is quite obviously easy to also apply to covers in which there are more than three cover pieces.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. A device for manufacturing the covers of a book using a surface material having a glue surface and cover pieces attached to the surface material, comprising a body equipped with a table-like work surface, in which there are marking to assist positioning, and a first movable guide that is a left guide and a second movable guide that is a right guide for guiding the cover pieces during gluing, wherein: the device includes a shelf-like support for supporting rear edges of the cover pieces so that said rear edges do not adhere to the glue surface in the initial stage of the gluing, said shelf-like support comprising a longitudinal support part elongated in the longitudinal direction so that the support part is suitable for simultaneously supporting the rear edges of a left and a right cover piece and of a spine piece, the shelf-like support comprises also a back wall part that is at an angle to the longitudinal support part and extends upwards from the longitudinal support part and in addition also left from the first movable guide and right from the second movable guide, the back wall part comprises two ends and is joined from said both ends to fastening devices that are located at the edges of the table-like work surface, the shelf-like support extends in the longitudinal direction beyond the longitudinal movement of said movable guides.

2. The device according to claim 1, wherein the table-like work surface comprises a light table and the longitudinal support part of the shelf-like support is an essentially horizontal surface at the edge of the light table used as a positioning surface.

3. The device according to claim 1, wherein in the guides there are support pieces, held in place with fastening devices such as screws that slide along a guide.

4. The device according to claim 1, wherein the device also includes a cutter equipped with guide surfaces, for cutting the corners of the surface material at an angle of about 45 degrees.

5. The device according to claim 1, wherein the guides are supported in the work position at a small distance from the surface of the table-like work surface.

6. The device according to claim 1, wherein the longitudinal support part is joined to the back wall part and extends in the longitudinal direction as far as the back wall part.

7. The device according to claim 1, wherein the device further comprises a rod to which said movable guides have been attached, said rod extending into brackets and therefore being longer than a width of fastening devices plus the width of the shelf-like support.

8. The device according to claim 1, wherein the device comprises sliding pieces to which the movable guides have been attached, whereby the sliding pieces are adapted to limit longitudinal movement area of said movable guides.

9. The device according to claim 8, wherein the sliding pieces are movable up to proximity of the fastening devices.

* * * * *